United States Patent [19]

Fitton

[11] 4,441,314
[45] Apr. 10, 1984

[54] COMBINED TURBINE POWER PLANT BLADE TIP CLEARANCE AND NACELLE VENTILATION SYSTEM

[75] Inventor: David L. Fitton, South Glastonbury, Conn.

[73] Assignee: United Technologies Corporation, Hartford, Conn.

[21] Appl. No.: 439,019

[22] Filed: Nov. 3, 1982

Related U.S. Application Data

[63] Continuation of Ser. No. 191,185, Sep. 26, 1980, abandoned.

[51] Int. Cl.³ .......................... F02C 6/14; F02K 3/06
[52] U.S. Cl. .................................. 60/266; 60/39.091; 60/226.1; 244/129.2
[58] Field of Search .............. 60/39.09 R, 226 R, 226; 169/45, 62; 244/129.2

[56] References Cited

U.S. PATENT DOCUMENTS

| 321,694 | 7/1985 | Darling | 137/625.47 |
|---|---|---|---|
| 2,560,091 | 7/1951 | Davis | 169/62 |
| 2,737,249 | 3/1956 | Pinkel | 169/62 |
| 2,952,125 | 9/1960 | Brunton | 60/39.09 R |
| 3,659,417 | 5/1972 | Grieb | 60/39.07 |
| 4,069,662 | 1/1978 | Redinger | 60/226 R |
| 4,091,613 | 5/1978 | Young | 60/39.07 |
| 4,163,366 | 8/1979 | Kent | 60/39.09 F |
| 4,271,666 | 6/1981 | Hurley | 60/226 R |
| 4,304,093 | 12/1981 | Schulze | 60/226 R |

Primary Examiner—Douglas Hart
Attorney, Agent, or Firm—Norman Friedland

[57] ABSTRACT

A single valve serves the multiple purpose of controlling cool airflow for either blade tip clearance control (active clearance control) or ventilation control of a jet engine installed in a nacelle of an aircraft. Means for blocking flow to either or both are contemplated as a fire retarding feature.

2 Claims, 2 Drawing Figures

COMBINED TURBINE POWER PLANT BLADE TIP CLEARANCE AND NACELLE VENTILATION SYSTEM

This is a continuation of application Ser. No. 191,185, filed Sept. 26, 1980, now abandoned.

Description

1. Technical Field

This invention relates to turbine power plants installed in the nacelle of aircraft and particularly to a combined tip clearance control, ventilation and shut-off system for retarding fires that may occur in the nacelle.

2. Background Art

As is well known, the turbine power plant powering aircraft is supported in a nacelle and because there exists the possibility of the collection of fumes from the fuel being furnished to the engine, it is desirable to provide ventilation to prevent the occurrence of fires. Also, in the event of a fire, it is desirable to provide means for starving the fire of air.

Further, in the interest of conservation of fuel, there has been a concerted effort to improve engine performance and hence improve thrust specific fuel consumption. One development of recent years has been the control of the clearance of the engines' rotating blades. For example, the top clearance control shown in the Redinger, Jr. et al. U.S. Pat. No. 4,069,662 exemplifies a system that essentially manifolds cooling air from a source (the fan or compressor) and impinges the air on the case to effectuate shrinkage thereof. This, in turn, positions the outer air seal closer to the tips of the turbine blades and hence avoids losses of the working medium.

I have found that I can obtain a more efficacious system by combining the active clearance control function with the ventilating and air/shut-off functions. According to this invention a single valve serves to bleed air from the fan discharge duct and manifold it to either the nacelle ventilation system or active clearance control system. It is contemplated that the valve will serve the shut-off feature for stopping the flow of air to these compartments.

DISCLOSURE OF THE INVENTION

An object of this invention is to provide a combined function of the active clearance control, nacelle compartment ventilation control and air shut-off means.

A feature of this invention is to utilize a single valve to accomplish the functions enumerated above.

Other features and advantages will be apparent from the specification and claims and from the accompanying drawings which illustrate an embodiment of the invention.

BEST MODE FOR CARRYING OUT THE INVENTION

Figure 1:
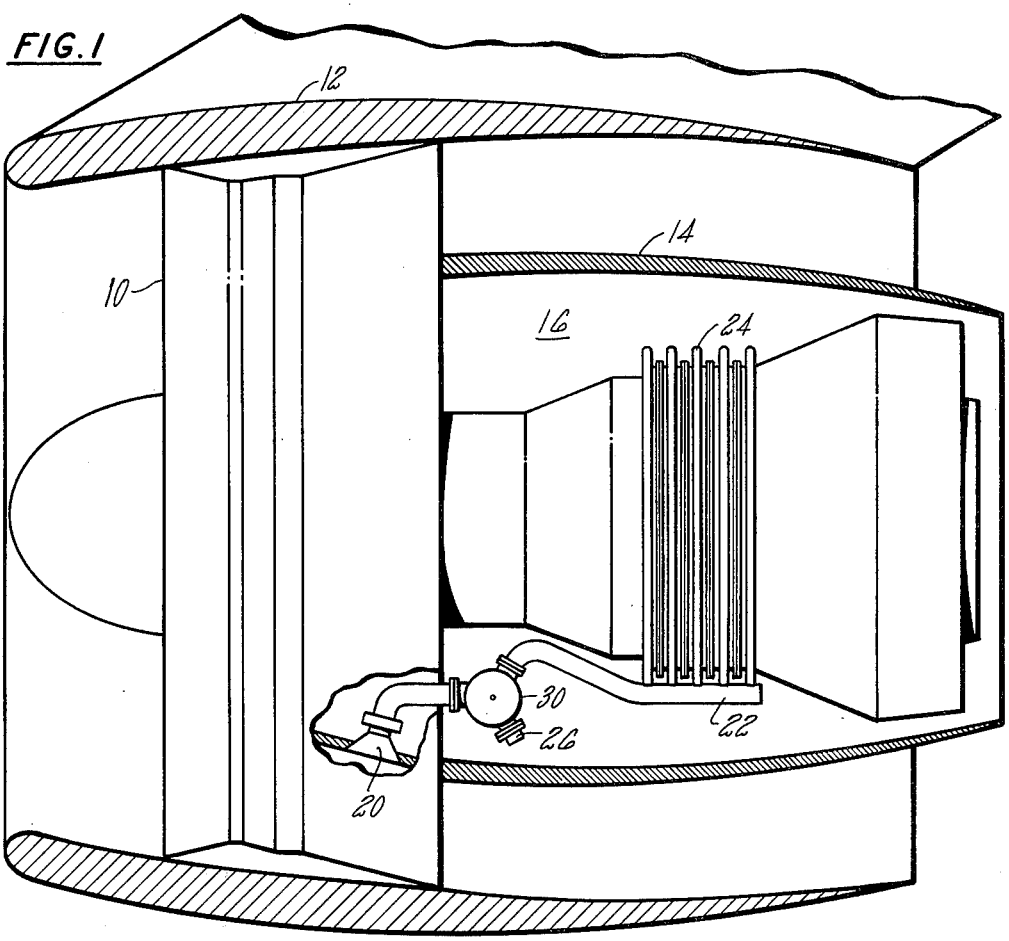
FIG. 1 is a view partly in schematic and partly in section illustrating the invention.
Figure 2:
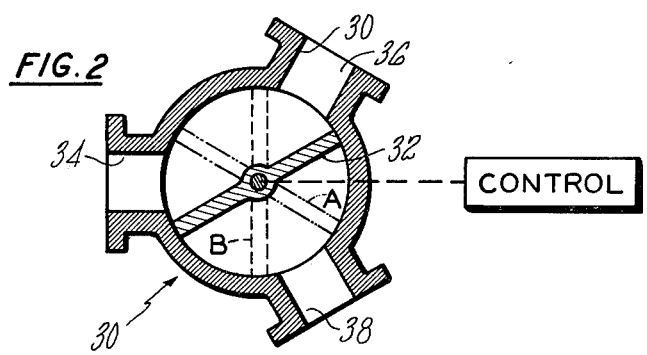
FIG. 2 is a schematic showing of the single valve and its different operating positions.

Referring to FIG. 1, the fan jet engine generally illustrated by reference numeral 10 is suitably mounted in nacelle 12. Surrounding the engine in the nacelle is a sheath 14 forming compartment 16 only schematically illustrated. This compartment is typically designed to have suitable sealing means for restricting the flow as will be fully explained hereinbelow. Also, this space may be compartmentized in smaller compartments strategically located.

Although this invention is described in its preferred embodiment employed with a fan-jet engine, other types of engines may be equally employed without departing from the scope of the invention. In the event that a fan is not employed, as one skilled in the art will recognize, engine compressor air could be substituted for the fan air.

The invention contemplates utilizing the existing active clearance control apparatus where it is compatible. As shown in FIG. 1, the active clearance control includes suitable plumbing to bleed fan air from pick-up 20 and direct it to manifold 22 where it is distributed to spray bars 24 for impinging fan air on the engine case. For further details of an active clearance control reference is hereby made to U.S. Pat. No. 4,069,662, supra. A second manifold or pipe 26 serves to feed fan air to compartment 16.

According to this invention valve 30 serves to control air to either the active clearance control or ventilation control. As shown, the butterfly element 32 directs flow from inlet port 34 to active clearance control outlet port 36. When element 32 is in position "A", flow is directed to the ventilation system port 38 and the outlet port 36 is bypassed. In position "B", flow is completely blocked off. Any suitable three-way valve can be employed without deviating from the scope of the invention. Also, the actuator may employ any suitable type and may be electrical, hydraulic, pneumatic or combination thereof.

As is apparent from the foregoing, when the active clearance control is activated, typically during cruise, the ventilation system is off. However, in this mode, the spent air after impinging on the engine case serves to vent the compartment. In either open position, it is contemplated that bleed air flows out of the compartment through equally spaced vents at a low pressure region at the aft end of the core compartment.

Also, it is apparent that when in position "B", airflow to the core compartment is shut off. This would only occur when fire is detected in the core compartment and serves to suppress the fire by curtailing the oxygen supply. Although not shown, those compartments are sealed and the air flowing therethrough is minimal.

In current power plants, core compartments are either always ventilated or always sealed. The ventilated compartment tends to be cooler and have a lower incidence of fires, but can experience fires of greater intensity. This invention combines the best features of both types without a significant cost and weight penalty by modifying the air inlet system which is used for active clearance control.

Further this invention also reduces fuel consumption at cruise by allowing the active clearance control air to perform the ventilation function. When the ventilation and clearance control systems are separate, an unnecessary bleed penalty occurs at cruise when both systems are flowing.

It should be understood that the invention is not limited to the particular embodiments shown and described herein, but that various changes and modifications may be made without departing from the spirit and scope of this novel concept as defined by the following claims.

I claim:

1. A combined engine case cooling system and ventilation system adapted for aircraft having a nacelle housing the engine, a sheath surrounding the engine in said nacelle defining at least one compartment, a source of cooling air, at least one spray bar surrounding said engine case, a first conduit means interconnecting said spray bar and said source for conducting the cooling air from said source to impinge on the case of the engine through openings in said spray bar to cause it to shrink and second conduit means for conducting cooling air from said source to said compartment so as to ventilate said compartment, said combined engine case cooling system and ventilation system consisting of a single valve disposed in said first conduit means and said second conduit means and control means for controlling said single valve for rendering either said engine case cooling system or said ventilation system inoperative wihle the other is in the operating mode.

2. A combined engine case cooling system and ventilation system as in claim 1 wherein the air discharging from said spray bar flows into said compartment and said control means further controls said single valve to render said engine case cooling system and said ventilation system inoperative so as to cease the flow of air in said compartment in order to retard a hostile fire.

* * * * *